United States Patent [19]

Engen

[11] Patent Number: 5,628,399
[45] Date of Patent: May 13, 1997

[54] INDICATING CD CASE INSERT

[76] Inventor: John R. Engen, 3721 Faulkner Dr., Apt. 309, Lincoln, Nebr. 68516

[21] Appl. No.: 562,748

[22] Filed: Nov. 27, 1995

[51] Int. Cl.⁶ .......................... B65D 85/30; B65D 85/00
[52] U.S. Cl. ........................ 206/308.1; 206/459.1
[58] Field of Search ...................... 206/308.1, 308.2, 206/307, 307.1, 459.1, 459.5, 310

[56] References Cited

U.S. PATENT DOCUMENTS

| | | | |
|---|---|---|---|
| 5,238,107 | 8/1993 | Kownacki | 206/310 |
| 5,251,750 | 10/1993 | Gelardi et al. | 206/310 |
| 5,265,721 | 11/1993 | Castritis | 206/309 |
| 5,366,073 | 11/1994 | Turrentine et al. | 206/309 |

*Primary Examiner*—Jimmy G. Foster
*Assistant Examiner*—Nhan Lam
*Attorney, Agent, or Firm*—Patent & Trademark Services; Joseph H. McGlynn

[57] ABSTRACT

An insert in a compact disc or laser disc case has a slot in the edge of the tray, through which a spring loaded clip protrudes. When a disc is inserted into the case the clip will be pushed against the low tension of a spring attached to the clip. When the clip is moved by the insertion of a disc a bright colored flag appears in a window in the case. When the disc is removed, the spring moves the flag so it is not visible, indicating that the case is empty.

11 Claims, 1 Drawing Sheet

1

INDICATING CD CASE INSERT

BACKGROUND OF THE INVENTION

This invention relates in general to compact disc cases and in particular to compact disc cases which have an indicator on the case to indicate whether the compact disc is in the case.

DESCRIPTION OF THE PRIOR ART

In the prior art various types of compact disc cases have been proposed. For example, U.S. Pat. No. 5,238,107 discloses a compact disc case which incorporates a pedestal which supports the disc in a manner to prevent warping. U.S. Pat. No. 5,251,750 discloses a compact disc case with a center rosette for securing a disc in the case. U.S. Pat. No. 5,265,721 discloses a compact disc case that allows the user to open the case and insert a disc using only one hand. U.S. Pat. No. 5,3,66,073 discloses a compact disc case having means for stacking multiple cases. However, none of the prior art devices disclose a case which will tell a user whether a compact disc is in the case. Most of the compact disc cases sold today have inserts which are much like album covers and which showing the singer or group that recorded the music. The back of the CD case may have credits for the artist, the producer, and the writers, along with the names of the songs on the CD.

Laser discs are similarly provided with fronts showing movie scenes like the covers on video cassette tapes, with the backs having credits and a short synopsis of the film.

While all this information is enjoyable to look at, and adds to the enjoyment of the user, it prevents a person form determining at a glance whether the disc is in the case. This requires a user to open the case to determine whether a CD or laser disc is actually in the case. Since these cases are sometimes difficult to open, this becomes a chore that the user will avoid if possible. This often results in a user mistakenly believing a CD is in its case when it is not, which can result in lost CD's.

SUMMARY OF THE INVENTION

The present invention provides a case with an indicator that is visible from the outside of the case, and the user can tell at a glance whether the case contains a CD or laser disc. Therefore, there will be less chance that a CD will be lost or misplaced.

The conventional insert in a compact disc or laser disc case has a slot in the edge of the tray, through which a spring loaded clip protrudes. When a disc is inserted into the case the clip will be pushed against the low tension of a spring attached to the clip. When the clip is moved by the insertion of a disc a bright colored flag appears in a window in the case. When the disc is removed, the spring moves the flag so it is not visible indicating that the case is empty.

It is an object of the present invention to provide a case for compact discs or laser discs which will indicate, at a glance, whether the disc is in its case.

These and other objects and advantages of the present invention will be fully apparent from the following description, when taken in connection with the annexed drawings.

DESCRIPTION OF THE PREFERRED EMBODIMENT

Figure 1:
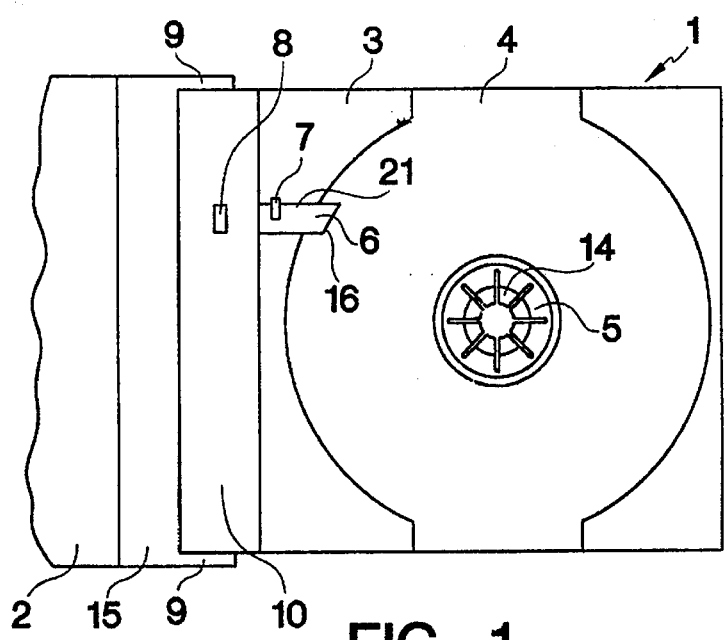
FIG. 1 is a plan view of a CD case insert.

Referring now to the drawings in greater detail, FIG. 1 shows a top view of an insert 1 for a compact disc (CD) case. It should be noted that the term compact disc (CD) is used throughout the specification as a convenience, however, the present invention can be used with other similar medium such as, but not limited to, laser discs. The insert 1 has a circular area 4 to receive the CD and a conventional central hub 5 with spring fingers 14 to engage the center hole in a CD (not shown) in order to secure the CD in the insert.

To one side of the circular area 4 is an enlarged area 10, to which is pivotally attached a cover 2 at 9. Area 15 is an open area that allows the cover to pivot closed. When the cover 2 is closed the open area 15 will overlie the enlarged area 10 on the insert, and therefore the area 10 will be visible when the cover is closed.

Figure 2:
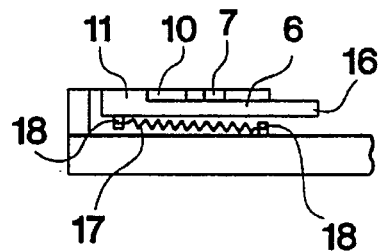
FIG. 2 is a side view of the CD indicator.

Formed to one side of the circular area 4 is a slot 21 which communicates with a window 8 in the enlarged area 10. Placed in the slot 9 is an indicator 6 which will indicate whether or not a CD is in the case when the case is closed. The indicator 6, as shown in FIG. 2 will be held to the right side of slot 6 by pressure from spring 17.

Although the spring 17 is shown as a tension spring, it should be understood that any resilient means that is capable of holding the indicator to one side of the slot 6 could be used without departing from the scope of the invention. The spring 17 is anchored at one end by a post 18 to the base of the CD insert 1. The other end of the spring is attached to the bottom of the indicator 6 by a similar post 18. These posts could be molded with the insert and indicator respectfully, or they could be separate pieces added after the insert and indicator are formed.

Figure 3:
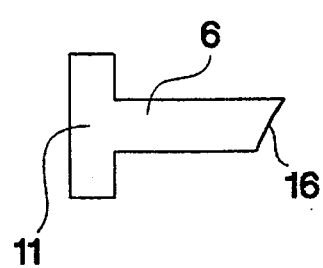
FIG. 3 is a plan view of the indicator.

As shown in FIG. 3, the end 16 of the indicator 6 is formed with a slanted surface to conform to the outer circumference of the CD. On the opposite end of the indicator is an enlarged head 11, which will preferably be a bright color such as yellow or orange so it can easily be seen.

Figure 4:
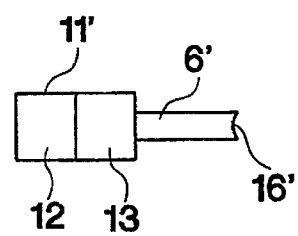
FIG. 4 is is a plan view of a second embodiment of the indicator.

A second indicator is shown in FIG. 4, and is similar to the indicator of FIG. 3 except the enlarged head 11' has two colors. The area 13 would be a bright color such as yellow or orange, and the area 12 would be a darker color such as black. The different colors would clearly indicated whether a CD is in the case. If the bright color is showing through the window 8 the CD is in the case; if the dark color is showing through the window 8 the CD is not in the case. The end 16' is curved to conform to the outer circumference of the CD. It should be noted that the curved surface 16' could be used on the FIG. 3 embodiment and the slanted surface of the FIG. 3 embodiment could be used on the FIG. 4 embodiment. As long as the end surface of the indicator can engage the periphery of the CD and the indicator will be moved by the insertion of the CD, it is not material whether the end surface is slanted or curved.

As shown in FIG. 1 a guard 7 could be applied over the slot 9 to hold the indicator 6 or 6' in the slot. The guard could be molded with the insert or could be an separate piece added at a later time. The guard should be large enough to hold the indicator 6 or 6' in the slot, but should not be too large so it interferes with the assembly of the indicator into the slot 9.

In use the present invention would be used in a manner similar to an ordinary CD case. The cover 2 would be opened and the indicator 6 would be forced to the right of the slot 9 (as seen in FIG. 1). If the FIG. 3 indicator is used, the bright colored head 11 will not show through the window 8. If the FIG. 4 indicator is used, the dark colored head 12 will show through the window 8. Next a CD will be inserted into the circular area 4 by tilting one side of the CD down and engaging it with the slanted surface 16 of the indicator 6. As the CD is pushed down to engage the hub 5, the indicator will be forced toward the left against the pressure of the spring 17. When the CD is engaged by the locking fingers 14, the bright colored head 11 on indicator 6 or 13 on indicator 6' will show through the window 8.

When the cover 2 is closed the window 8 will still show through the open area 15 of the cover. Therefore, even though the CD can not be seen due to the material that is usually placed in the cover (such as album covers) the bright colored indicator can be seen through the window 8, and the user knows that a is present in the case.

Figure 5:
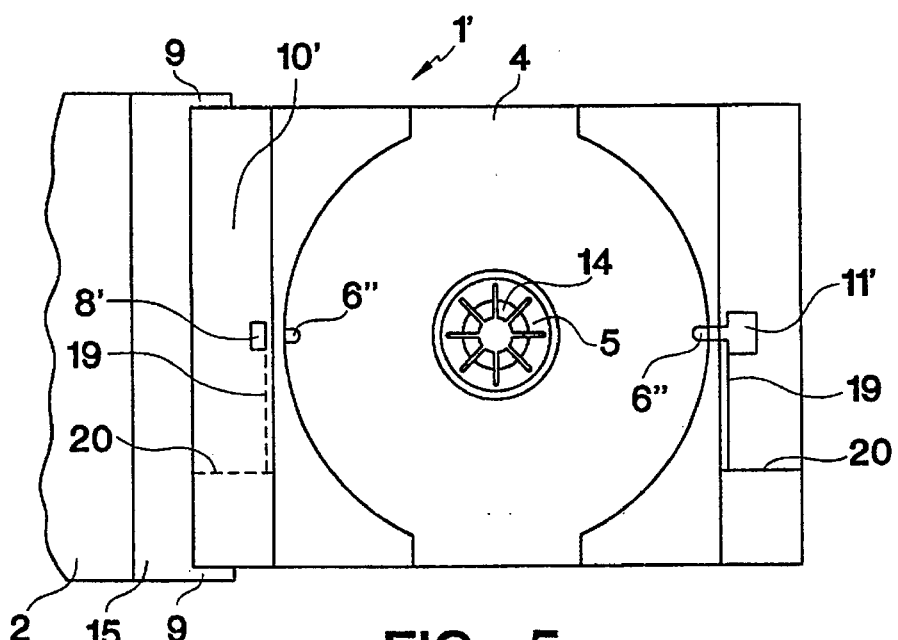
FIG. 5 is a plan view of a second embodiment of a CD case insert.

FIG. 5 shows a second embodiment of the indicating CD case insert of the present invention which is similar to the FIG. 1 embodiment and wherein like elements are indicated with like reference numbers. The insert of FIG. 1 shows a top view of an insert 1' for a compact disc (CD) case. The insert 1' has a circular area 4 to receive the CD and a conventional central hub 5 with spring fingers 14 to engage the center hole in a CD (not shown) in order to secure the CD in the insert.

To both sides of the circular area 4 are enlarged areas 10', to one of which is pivotally attached a cover 2 at 9. Area 15 is an open area that allows the cover to pivot closed. When the cover 2 is closed the open area 15 will overlie the enlarged area 10' on the left side of the insert, and therefore the area 10' will be visible when the cover is closed.

Formed to one side of the circular area 4 is a slot 21 (not shown, but similar to slot 21 in FIG. 1) which communicates with a window 8' in the enlarged area 10'. Placed in the slot 21 is an indicator 6" which will indicate whether or not a CD is in the case when the case is closed, similar to the indicator 6 in FIG. 1. Attached to indicator 6" is a piece of spring material 19 which is anchored at 20. The element 19 can be made from springy metal or plastic and can be unitary with the indicator 6' or can be a separate piece that is integrally joined such as by, but not limited to, gluing or ultrasonic welding.

The end of indicator 6' can have a rounded end, as shown, or it could have a slanted end similar to end 16 shown in FIGS. 1 and 3. On the opposite end is an enlarged area 11' which could have the double color, one bright and one dark, as shown in FIG. 4. The bright color would indicate the presence of a CD, and the dark color would indicate that no CD is in the case.

Also, it should be noted that even though the embodiment of FIG. 5 has an enlarged area 10' on each side, the case could be made with a single area 10' without departing from the scope of the invention. The embodiment of FIG. 5 would be used in a similar manner as the case in FIG. 1 is used.

Although the indicating CD case insert and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. An insert for an information recording disc case, said case having a base in which said insert is mounted, and a cover for protecting an information recording disc placed in said case, said insert comprising:

a base member having a central circular aperture for receiving an information recording disc, a locking means for securing said information recording disc mounted in said central circular aperture, indicating means mounted adjacent said central circular aperture for indicating the presence of an information recording disc in said disc case when said cover for said disc case is closed.

2. The insert for an information recording disc case as claimed in claim 1, wherein said indicating means is spring biased toward said central circular aperture.

3. The insert for an information recording disc case as claimed in claim 1, wherein said indicating means is a laterally sliding member, said laterally sliding member having a first end which will engage a periphery of said information recording disc when said information recording disc is in said disc case, said laterally sliding member having a second end which will be visible only when said information recording disc is in said disc case.

4. The insert for an information recording disc case as claimed in claim 3, wherein said first end has a slanted surface which engages said periphery of said information recording disc when said information recording disc is in said disc case.

5. The insert for an information recording disc case as claimed in claim 3, wherein said first end has a curved surface which engages said periphery of said information recording disc when said information recording disc is in said disc case.

6. The insert for an information recording disc case as claimed in claim 3, wherein said insert has an indicating aperture adjacent said central circular aperture, said second end of said laterally sliding member being visible through said indicating aperture only when said information recording disc is in said disc case.

7. The insert for an information recording disc case as claimed in claim 3, wherein said second end has a color means for increasing visibility of said second end.

8. The insert for an information recording disc case as claimed in claim 1, wherein said indicating means is a pivoted member, said pivoted member having a first end which is fixed to said case, and a second end which is free to move, said pivoted member second end having a first portion which will engage a periphery of said information recording disc when said information recording disc is in said disc case, said pivoted member second end having a second portion which will be visible only when said information recording disc is in said disc case.

9. The insert for an information recording disc case as claimed in claim 8, wherein said pivoted member is resilient.

10. The insert for an information recording disc case as claimed in claim 8, wherein said pivoted member first portion is rounded.

11. The insert for an information recording disc case as claimed in claim 8, wherein said second portion has a color means for increasing visibility of said second end.

* * * * *